(12) United States Patent
Fukumoto et al.

(10) Patent No.: US 9,509,780 B2
(45) Date of Patent: Nov. 29, 2016

(54) INFORMATION PROCESSING SYSTEM AND CONTROL METHOD OF INFORMATION PROCESSING SYSTEM

(71) Applicant: FUJITSU LIMITED, Kawasaki-shi, Kanagawa (JP)

(72) Inventors: Naoto Fukumoto, Kawasaki (JP); Akira Naruse, Machida (JP); Kohta Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 221 days.

(21) Appl. No.: 14/444,979

(22) Filed: Jul. 28, 2014

(65) Prior Publication Data

US 2015/0052263 A1 Feb. 19, 2015

(30) Foreign Application Priority Data

Aug. 15, 2013 (JP) .................................. 2013-168996

(51) Int. Cl.
*G06F 15/16* (2006.01)
*H04L 29/08* (2006.01)
*G06F 9/52* (2006.01)
*H04L 29/06* (2006.01)

(52) U.S. Cl.
CPC .............. *H04L 67/16* (2013.01); *G06F 9/522* (2013.01); *H04L 29/06* (2013.01); *H04L 29/0854* (2013.01)

(58) Field of Classification Search
CPC .................... H04L 29/0854; H04L 29/08072
See application file for complete search history.

(56) References Cited

U.S. PATENT DOCUMENTS

| | | | | |
|---|---|---|---|---|
| 5,928,351 A | * | 7/1999 | Horie | G06F 9/52 712/11 |
| 6,192,391 B1 | * | 2/2001 | Ohtani | G06F 9/52 709/201 |
| 6,650,660 B1 | * | 11/2003 | Koehler | H04L 29/06 370/474 |
| 7,233,613 B2 | * | 6/2007 | Taniguchi | H04B 1/708 375/142 |

(Continued)

FOREIGN PATENT DOCUMENTS

JP 7-152712 6/1995

OTHER PUBLICATIONS

JP-07-152712-NPL (Multiprocessor for Executing Barrier Synchronization, Jun. 16, 1995).*

*Primary Examiner* — Razu A Miah
(74) *Attorney, Agent, or Firm* — Fujitsu Patent Center

(57) ABSTRACT

A node includes a sending unit that sends a signal to another node; a receiving unit that receives a signal from another node; a determining unit that determines, when the sending unit sends a signal to the other node, that synchronization has been established with the other node, that determines, when the receiving unit receives a signal from another node, that synchronization has been established with the other node, and that determines, when a node in which synchronization has already been established with the other two nodes in each of which synchronization has been established, that synchronization has been established with the nodes; and a selecting unit that selects an information processing apparatus that is not determined, by the determining unit, that synchronization has been established as the other node at the sending destination for the signal.

12 Claims, 7 Drawing Sheets

(56) References Cited

U.S. PATENT DOCUMENTS

| | | | | |
|---|---|---|---|---|
| 7,821,919 B2* | 10/2010 | Mizutani | ............ | G06F 11/1443 370/216 |
| 7,840,711 B2* | 11/2010 | Otoshi | ................... | A63F 13/12 370/241 |
| 2002/0087731 A1* | 7/2002 | Morrison | .................. | G06F 1/14 709/248 |
| 2008/0310570 A1* | 12/2008 | Tomita | ..................... | G06F 1/12 375/357 |
| 2009/0201936 A1* | 8/2009 | Dumet | .................. | H04J 3/0641 370/401 |
| 2010/0124241 A1* | 5/2010 | Hiramoto | ................ | G06F 9/522 370/509 |
| 2010/0195760 A1* | 8/2010 | Weiss | ...................... | H04N 5/38 375/295 |
| 2010/0325089 A1* | 12/2010 | Hopkins | ........... | G06F 17/30861 707/622 |
| 2011/0128977 A1* | 6/2011 | Suzuki | ............... | G06F 13/4239 370/498 |
| 2012/0233490 A1* | 9/2012 | Barton | ............... | H04L 67/1095 713/503 |

\* cited by examiner

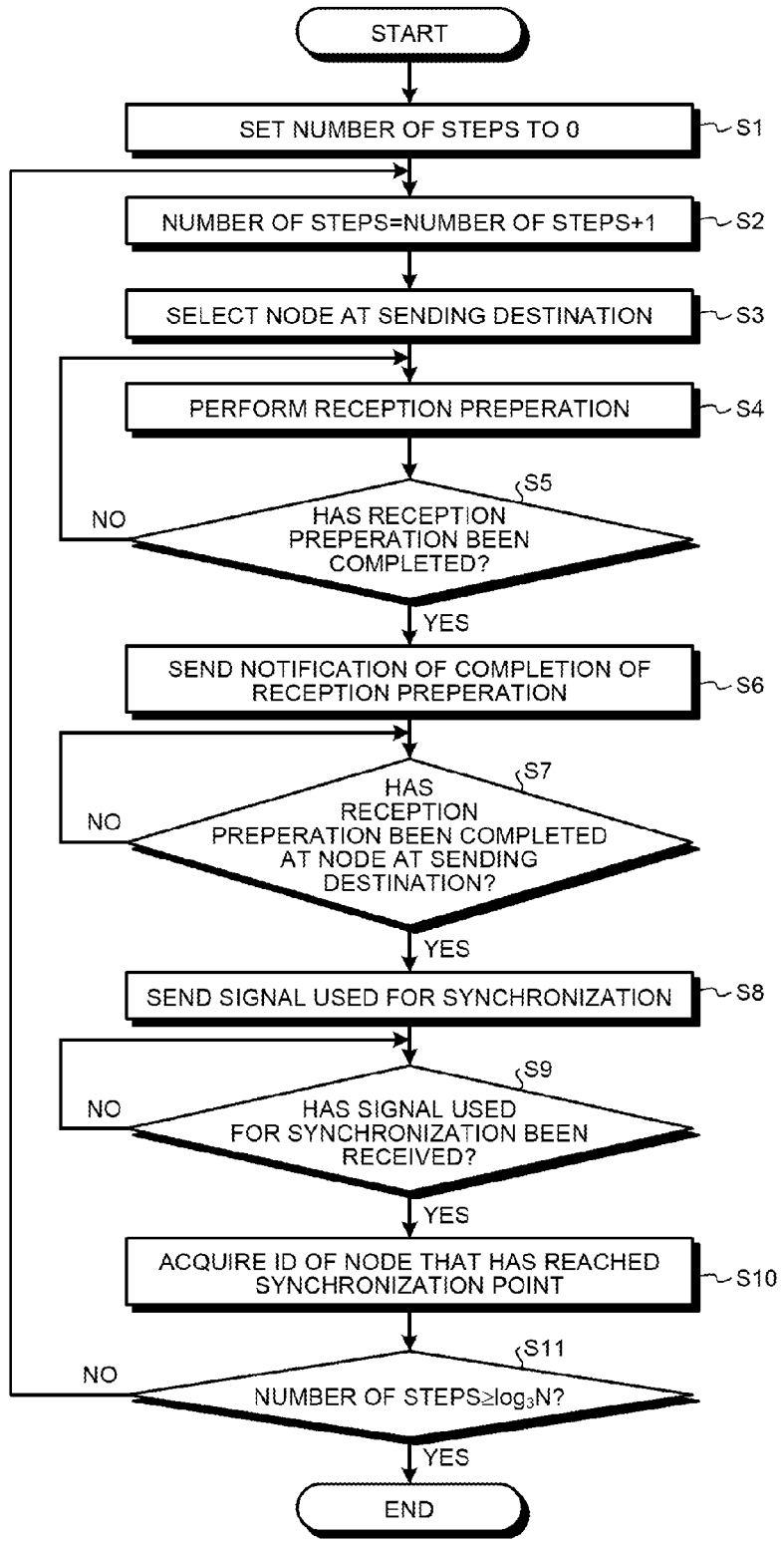

INFORMATION PROCESSING SYSTEM AND CONTROL METHOD OF INFORMATION PROCESSING SYSTEM

CROSS-REFERENCE TO RELATED APPLICATION

This application is based upon and claims the benefit of priority of the prior Japanese Patent Application No. 2013-168996, filed on Aug. 15, 2013, the entire contents of which are incorporated herein by reference.

FIELD

The embodiments discussed herein are directed to an information processing system and a control method of the information processing system.

BACKGROUND

In parallel computer systems that are information processing systems, barrier synchronization is known as a method for synchronizing multiple processes performed, in parallel processing, by multiple nodes. In the barrier synchronization, a synchronization point in which synchronization is performed is set in accordance with stages of progress of a process. In a process that performs the barrier synchronization, if a process performed by a node reaches the synchronization point, the node waits, by temporarily stopping the process, for the progress of the processes performed by other nodes. The process that performs the barrier synchronization ends its waiting state when all of the processes that perform the barrier synchronization in parallel processing reaches the synchronization point and then restarts the stopped process. Consequently, it is possible to synchronize the parallel processing between multiple processes that are performed among the multiple nodes.

There is a conventional technology in which, for example, in a barrier synchronization device, a combination of two nodes repeatedly exchange messages and check whether all nodes reach a synchronization point. For example, two nodes are grouped into a single group and, when the sending and receiving of data have been completed between these two nodes, it is determined that these two nodes in the same group reach the synchronization point. Thereafter, when a specific node in each group was able to send and receive data to and from a specific node in the subsequent group, it is determined that the process reaches a synchronization point with respect to the counterpart group. Then, this process is repeatedly performed until all of the nodes reach the synchronization point.

When the barrier synchronization is performed in this way, the time taken to perform the barrier synchronization is proportional to $\log_2 N$, where the number of nodes is N.
Patent Document 1: Japanese Laid-open Patent Publication No. 07-152712

However, in the conventional technology in which synchronization is repeatedly performed by using two nodes as a group, because the ratio of the time taken for the barrier synchronization to the time taken for overall process increases as the number of nodes increase, the barrier synchronization is a bottleneck in the process. In particular, some supercomputers used in recent years include thousands to tens of thousands of nodes and, furthermore, the number of nodes tends to be increased; therefore, the time taken for the barrier synchronization is being increased.

SUMMARY

According to an aspect of an embodiment, an information processing system includes: a plurality of information processing apparatuses, wherein each of the information processing apparatuses includes a sending unit that sends a signal to another information processing apparatus, a receiving unit that receives a signal from another information processing apparatus, a determining unit that determines, when the sending unit sends a signal to another information processing apparatus, that synchronization has been established with the information processing apparatus at the sending destination, that determines, when the receiving unit receives a signal from another information processing apparatus, that synchronization has been established with the information processing apparatus at the sending source, and that determines, when an information processing apparatus in which synchronization has been established with the information processing apparatus that has been determined that synchronization was established is further present, that synchronization has been established with the information processing apparatus that has been determined to be further present, and a selecting unit that selects an information processing apparatus that is not determined, by the determining unit, that synchronization has been established as an information processing apparatus at the sending destination of a signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a flowchart illustrating a barrier synchronization process performed by the information processing system according to the first embodiment;

DESCRIPTION OF EMBODIMENTS

Preferred embodiments of the present invention will be explained with reference to accompanying drawings. The information processing system and the control method of the information processing system disclosed in the present invention are not limited to the embodiments described below.

[a] First Embodiment

Figure 1:
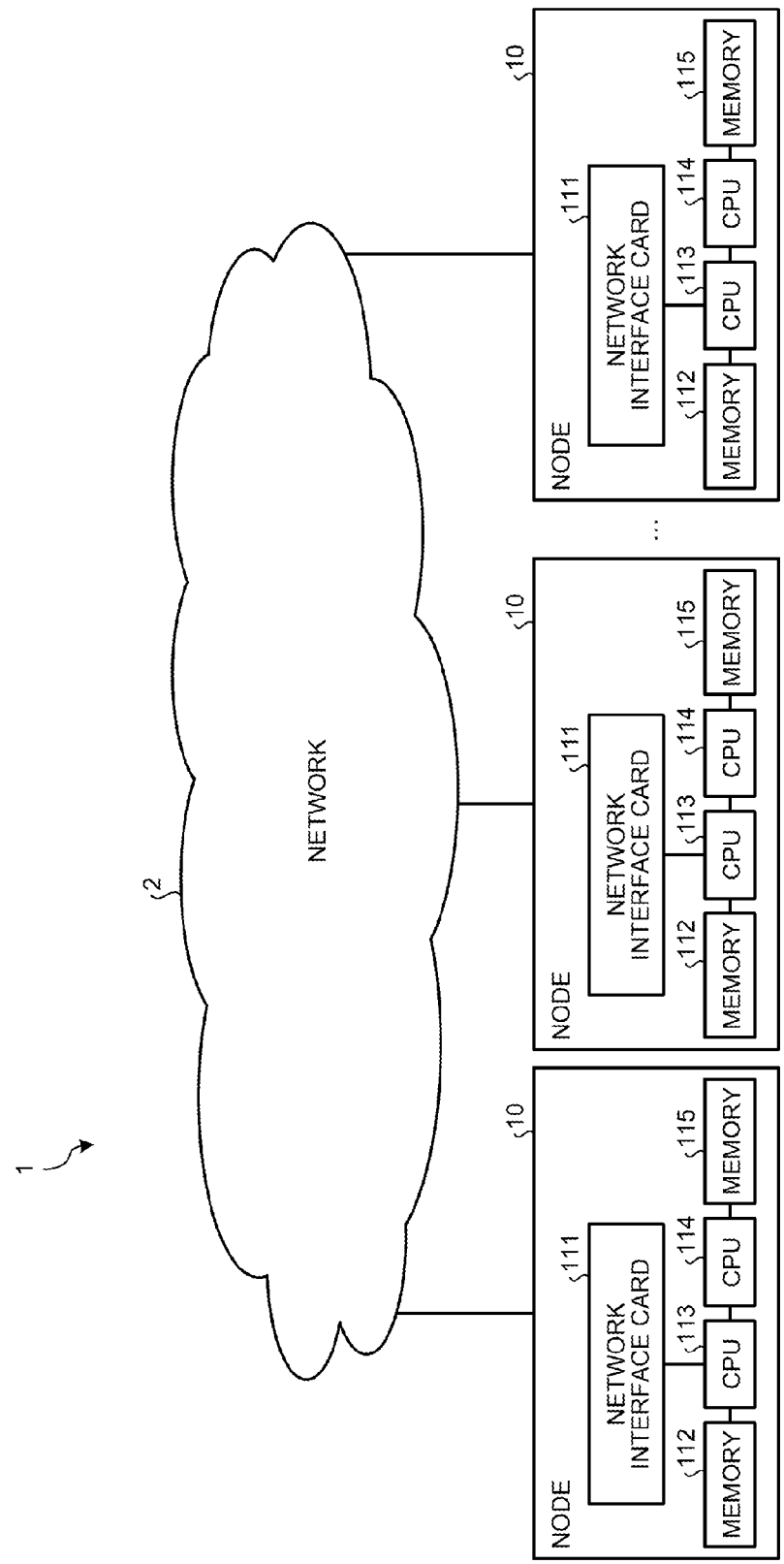
FIG. 1 is a schematic diagram illustrating the configuration of an information processing system according to a first embodiment.

FIG. 1 is a schematic diagram illustrating the configuration of an information processing system according to a first embodiment. As illustrated in FIG. 1, an information processing system 1 includes multiple nodes 10. The nodes 10 are connected each other by a network 2. The information processing system 1 is, for example, a parallel computer system. The nodes 10 are examples of information processing apparatuses.

The nodes 10 are information processing apparatuses each of which includes a central processing unit (CPU) that functions as an information processing unit in which a single operating system (OS) is running and includes a memory that functions as a storing unit. Each of the nodes 10 includes at least a main memory and one or more CPUs.

In the first embodiment, each of the nodes 10 includes memories 112 and 115, CPUs 113 and 114, and a network interface card (NIC) 111.

The CPU 113 and the CPU 114 are connected with each other and are able to send and receive data. The memory 112 is connected to the CPU 113. The memory 115 is connected to the CPU 114. Furthermore, the network interface card 111 is connected to the CPU 113. In the first embodiment, the CPU 114 communicates with the network interface card 111 via the CPU 113.

The network interface card 111 is connected to the network 2. The network interface card 111 according to the first embodiment performs communication by using InfiniBand. With an interconnection, such as InfiniBand, before data is sent and received, sending and receiving of information indicating whether a preparation for data reception has been completed at the sending destination is performed at the hardware level. For example, the network interface card 111 does not send a packet until information indicating that there is free space in a reception buffer at the sending destination is received from the network interface card 111 at the sending destination.

At this point, in the first embodiment, the network interface card 111 performs communication by using the InfiniBand; however, the configuration is not limited thereto as long as the network interface card 111 includes a communication interface, as a network interface between nodes, that can check whether, before data is sent, a preparation for data reception has been completed at the sending destination. Specifically, a network interface card, in which an interface that uses credit based flow control is used for a network between nodes, may be used for the network interface card 111.

In the following, a description will be given of communication that is performed by using the InfiniBand. There are two types of operations for the communication that is performed by using the InfiniBand: a Send/Receive operation and a Remote Direct Memory Access (RDMA) write operation. In the Send/Receive operation, if the node 10 at the reception side does not perform the "Receive" operation, the sending of data has not been completed. If the node 10 at the reception side does not perform the "Receive" operation, a Nack is sent to the node 10 on the transmission side and thus the node 10 on the transmission side resends the data. In such a case, for example, the latency at the time of 4B transmission is 4.8 μseconds. Furthermore, in the RDMA write operation, the node 10 on the transmission side can send data regardless of whether a preparation has been completed on the counterpart side. In such a case, for example, the latency at the time of 4B transmission is 3.8 μseconds. A designer can select which operation, between the Send/Receive operation and the RDMA write operation, is used in the information processing system 1.

Each of the nodes 10 can send and receive data via the network interface card 111 and the network 2.

Furthermore, identification information (Identification: ID) is allocated to each of the nodes 10. Specifically, when the CPUs 113 and 114 in each of the nodes 10 execute programs first, information indicating which process is allocated to which of the node IDs is sent to all of the nodes 10. Then, by referring to the information in which node IDs are associated with processes, the process executed by each of the CPUs 113 and 114 can acquire which ID is allocated to which node.

Figure 2:
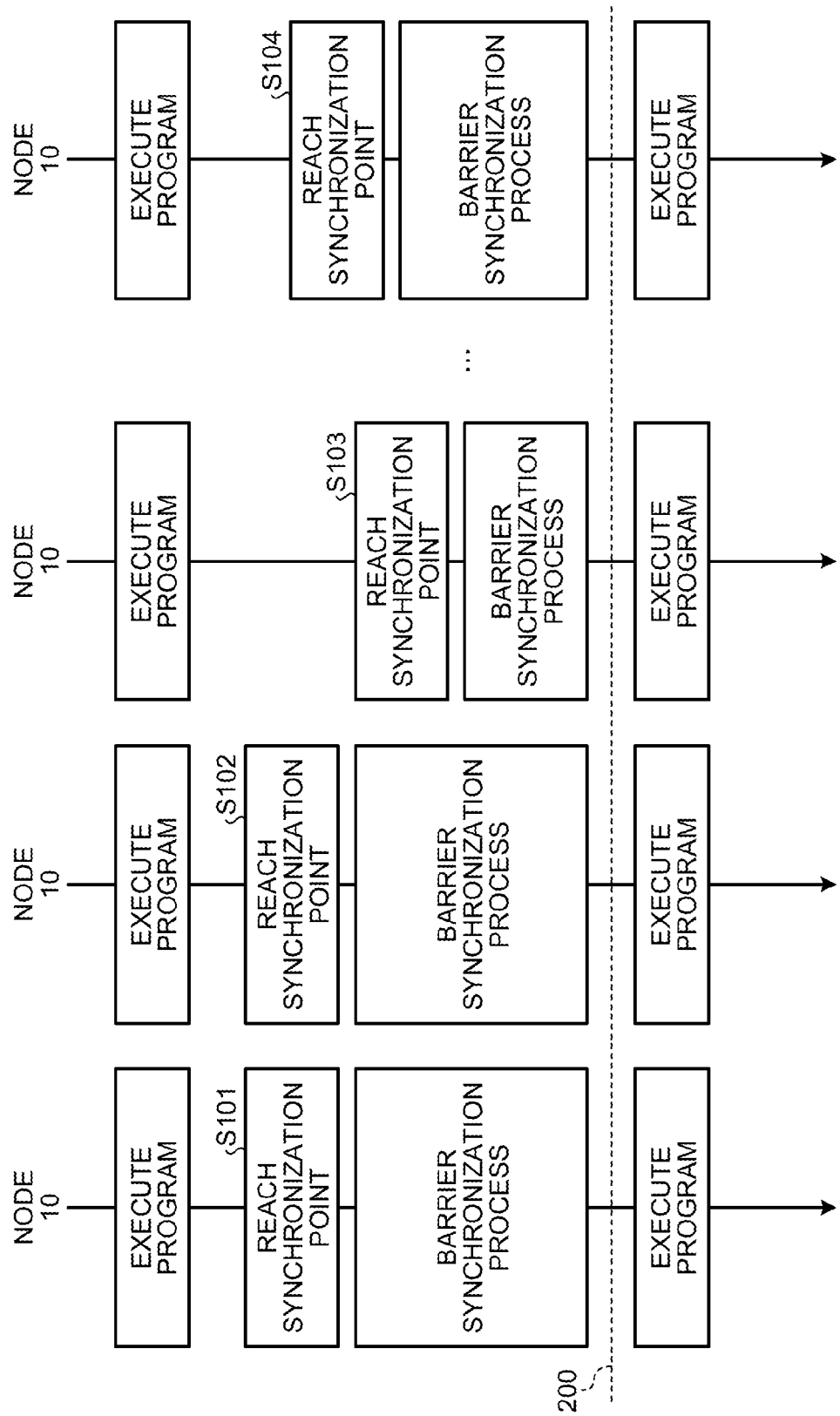
FIG. 2 is a schematic diagram illustrating the outline of a program execution process that includes a barrier synchronization process.

FIG. 2 is a schematic diagram illustrating the outline of a program execution process that includes a barrier synchronization process. The blocks illustrated on the vertical axis in FIG. 2 indicate the processes performed by the different nodes 10. Furthermore, the vertical axis represents elapsed time in the downward direction.

Each of the nodes 10 executes a program. All of the nodes 10 execute the programs by cooperating with each other. Then, as illustrated by Steps S101 to S104, each of the nodes 10 reaches the synchronization point in a code in the program. At this point, as illustrated by Steps S101 to S104, each of the nodes 10 executes different process, thus the timing at which each of the nodes 10 reaches the synchronization point differs.

When each of the nodes 10 reaches the synchronization point, each of the nodes 10 performs the barrier synchronization process and then synchronizes with all of the nodes 10. At this point, as described above, because the timing at which each of the nodes 10 reaches the synchronization point may sometimes differ, in order to synchronize with all of the nodes 10, the node 10 that reached the synchronization point earlier needs to wait until synchronization is performed with the node 10 that reaches the synchronization point later.

Then, when all of the nodes 10 are synchronized with each other, the barrier synchronization process ends and, at a timing 200, the program is continuously performed in each of the nodes 10 in which the barrier synchronization has been performed.

As described above, the nodes 10 wait until the barrier synchronization process has been completed. Consequently, the time taken for the barrier synchronization process can be reduced, which greatly contributes a reduction in the processing time in the information processing system 1. Accordingly, in the following, a description will be given, in detail, of the node 10 that performs the barrier synchronization process.

Figure 3:
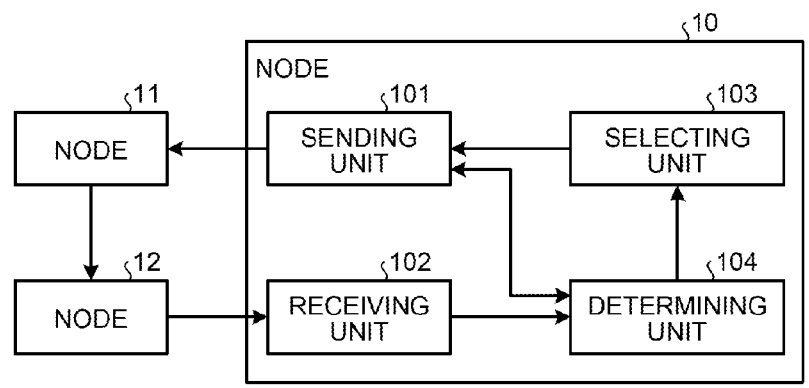
FIG. 3 is a block diagram illustrating, in detail, nodes according to the first embodiment.

FIG. 3 is a block diagram illustrating, in detail, nodes according to the first embodiment. As illustrated in FIG. 3, the node 10 includes a sending unit 101, a receiving unit 102, a selecting unit 103, and a determining unit 104. The functions performed by the sending unit 101 and the receiving unit 102 are implemented by the network interface card 111. Furthermore, the functions performed by the selecting unit 103 and the determining unit 104 are implemented by the CPUs 113 and 114 and the memories 112 and 115.

Furthermore, it is assumed that the sending destination node to which the node 10 sends a synchronization signal is a node 11. Furthermore, it is assumed that the sending source node of the synchronization signal that is received by the node 10 is a node 12.

The sending unit 101 receives, from the selecting unit 103, identification information on the node 11 that is selected as the sending destination node by the selecting unit 103.

The sending unit 101 acquires, from the determining unit 104, the ID of the other node that has already been checked that the node 10 has already reached the synchronization point. Then, the sending unit 101 creates a synchronization signal that includes the ID of the other node that has already been checked that the other node has already reached the synchronization point.

Then, the sending unit 101 waits until a notification indicating that a reception preparation has been completed is received from the node 11 that has the received ID. Thereafter, when the notification indicating that the reception preparation has been completed is received from the node 11, the sending unit 101 sends a synchronization signal to the node 11. Furthermore, the sending unit 101 notifies the determining unit 104 of the ID of the node 11 at the sending destination.

The sending unit 101 repeatedly sends a synchronization signal with respect to the node 10 selected by the selecting unit 103 until all of the nodes 10 reach the synchronization point and the selecting unit 103 completes the selection of the node 10.

The receiving unit 102 starts a reception preparation when all of the nodes reach the synchronization point. Then, when the reception preparation has been completed, the receiving unit 102 sends a notification to the node 12 indicating that the reception preparation has been completed. Then, the receiving unit 102 receives a synchronization signal from the node 12. Then, the receiving unit 102 outputs the received synchronization signal to the determining unit 104.

The receiving unit 102 repeatedly receives a synchronization signal until all of the nodes 10 reach the synchronization point.

Figure 4:
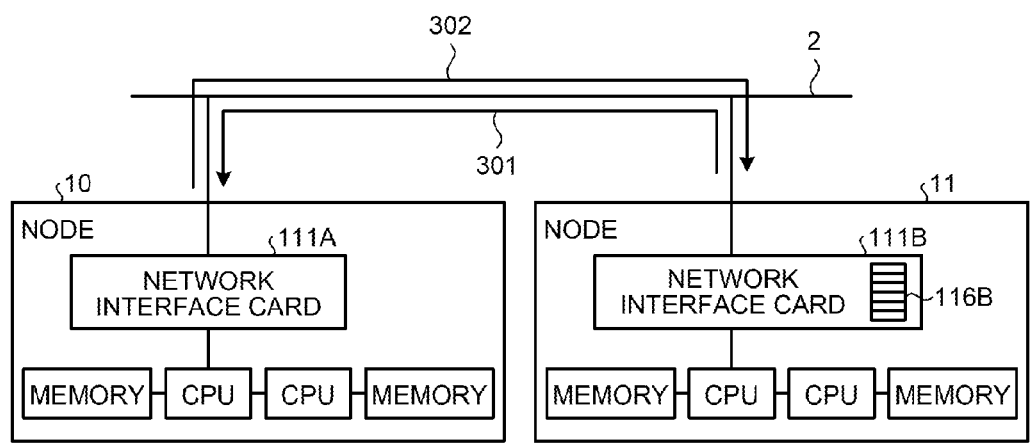
FIG. 4 is a schematic diagram illustrating transmission of a synchronization signal.

In the following, transmission of a synchronization signal will be described in detail with reference to FIG. 4. FIG. 4 is a schematic diagram illustrating transmission of a synchronization signal. A description will be given of the nodes 10 and 11 as examples. Because a notification of the completion of a reception preparation is sent at the hardware level, here, a description of the operation will be given by using hardware, such as network interface cards 111A and 111B, that implements the function performed by the sending unit 101 and the receiving unit 102.

The node 10 includes the network interface card 111A. The network interface card 111B in the node 11 includes a reception buffer 116B. In practice, the network interface card 111A also includes a reception buffer; however, here, a description thereof will be omitted for convenience of description.

When the node 11 reaches a synchronization point, the network interface card 111B starts a reception preparation. Then, the network interface card 111B allows the reception buffer 116B to be a state in which no free space is present until the reception preparation has been completed. When the reception preparation has been completed, the network interface card 111B makes the space of the reception buffer 116B empty and sends, to the network interface card 111A, a signal 301 that indicates that the reception buffer 116B is empty.

When the network interface card 111A receives the signal 301, the network interface card 111A sends the synchronization signal 302 to the network interface card 111B.

Because the reception preparation has been completed in the network interface card 111B, the network interface card 111B can receive the signal 301.

As described above, the network interface card 111A in the node 10 on the transmission side of the synchronization signal accepts the signal 301 that notifies information indicating that the reception buffer 116B is empty as information indicating that the reception preparation has been completed in the node 11 that is the sending destination. Consequently, by sending the synchronization signal to the node 11, the node 10 can recognize that the node 11 has reached the synchronization point.

The determining unit 104 acquires, from the sending unit 101, the ID of the node 11 that is the sending destination and to which the synchronization signal is sent. Furthermore, the determining unit 104 acquires the ID of the node that has already reached to the synchronization point, which has been checked by the node 12 that is the sending source. Here, for example, by sending a synchronization signal in accordance with a predetermined algorithm, the determining unit 104 can estimate the ID of the node that has already reached to the synchronization point, which has been checked by the node 12 at the sending destination, and can acquire the ID of the node.

Furthermore, the determining unit 104 acquires, from the receiving unit 102, the synchronization signal received by the receiving unit 102. Then, the determining unit 104 acquires, from the synchronization signal acquired from the receiving unit 102, the ID of the node 12 that is the sending source of that signal. Furthermore, the determining unit 104 acquires, from the acquired synchronization signal, the ID of the other node that has reached the synchronization point, which has been checked by the node 12 that is the sending source of that signal. Then, the determining unit 104 determines that the node 11, which is the sending destination of the synchronization signal, the node 12, which is the sending source of the synchronization signal, and the node that has reached the synchronization point, which has been checked by the node 12, have reached the synchronization point.

Then, the determining unit 104 increments the step of the completion of the process that determines whether a node has reached the synchronization point by 1 and notifies the selecting unit 103 of the number of completed steps.

Furthermore, if the determining unit 104 has checked whether all of the nodes 10 in the information processing system 1 have reached the synchronization point, the determining unit 104 notifies the selecting unit 103 that the barrier synchronization process has ended. Here, for example, when the total number of nodes 10 in the information processing system 1 is "N", if the number of steps in which the determination has been completed becomes equal to or greater than $\log_3 N$, the determining unit 104 can determine that all of the nodes 10 have reached the corresponding synchronization point.

The selecting unit 103 selects the node 11 that is the sending destination and that satisfies the following condition. Namely, the selecting unit 103 selects a node that has not been checked whether the node has reached the synchronization point and a node, from among nodes that have been checked by the checked node and that have reached the synchronization point, that has not been checked, by the node 10, whether the node has reached the synchronization point.

At this point, if the number of nodes that have been checked, by the node 11 at the sending destination, that the nodes have already reached the synchronization point is the same, nodes can be more efficiently selected as the number of nodes that have been checked, by the node 10, that the nodes have reached the synchronization point is decreased. Accordingly, a description will be given of an example of a high efficient algorithm used when the selecting unit 103 selects the node 11 at the sending destination.

Here, the total number of nodes 10 belonging to the information processing system 1 is defined as "N". Furthermore, the ID with a sequence number starting from zero is allocated to each of the nodes 10. Furthermore, the number of steps in which the determination of the reaching of the synchronization point is performed is defined as "S:S=1, 2, 3 . . . ". Furthermore, the ID of its own node 10 is defined as "A".

The selecting unit 103 obtains S by adding 1 to the number of steps, received from the determining unit 104, in which the determination of the reaching of the synchronization point has been completed.

Then, the selecting unit 103 obtains the ID of the node 11 at the sending destination as $(A+3^{S-1})$ modN, where "mod" is calculation symbol indicating a remainder, where the remainder is a positive integer. For example, if the ID of the node 11 at the sending destination can be obtained by 7 mod 5, because 7 divided by 5 is 1 with a reminder of 2, the selecting unit 103 selects "2" as the ID of the node 11 at the sending destination.

Furthermore, for another example method of selecting the ID, the selecting unit 103 may also obtain the ID of the node 11 at the sending destination as $(A-3^{S-1})$ modN. In such a case, for example, when the ID of the node 11 that at sending destination can be obtained by −1 mod 5, because −1 divided by 5 is −1 with a remainder of 4, the selecting unit 103 selects "4" as the ID of the node 11 at the sending destination.

Figure 5:
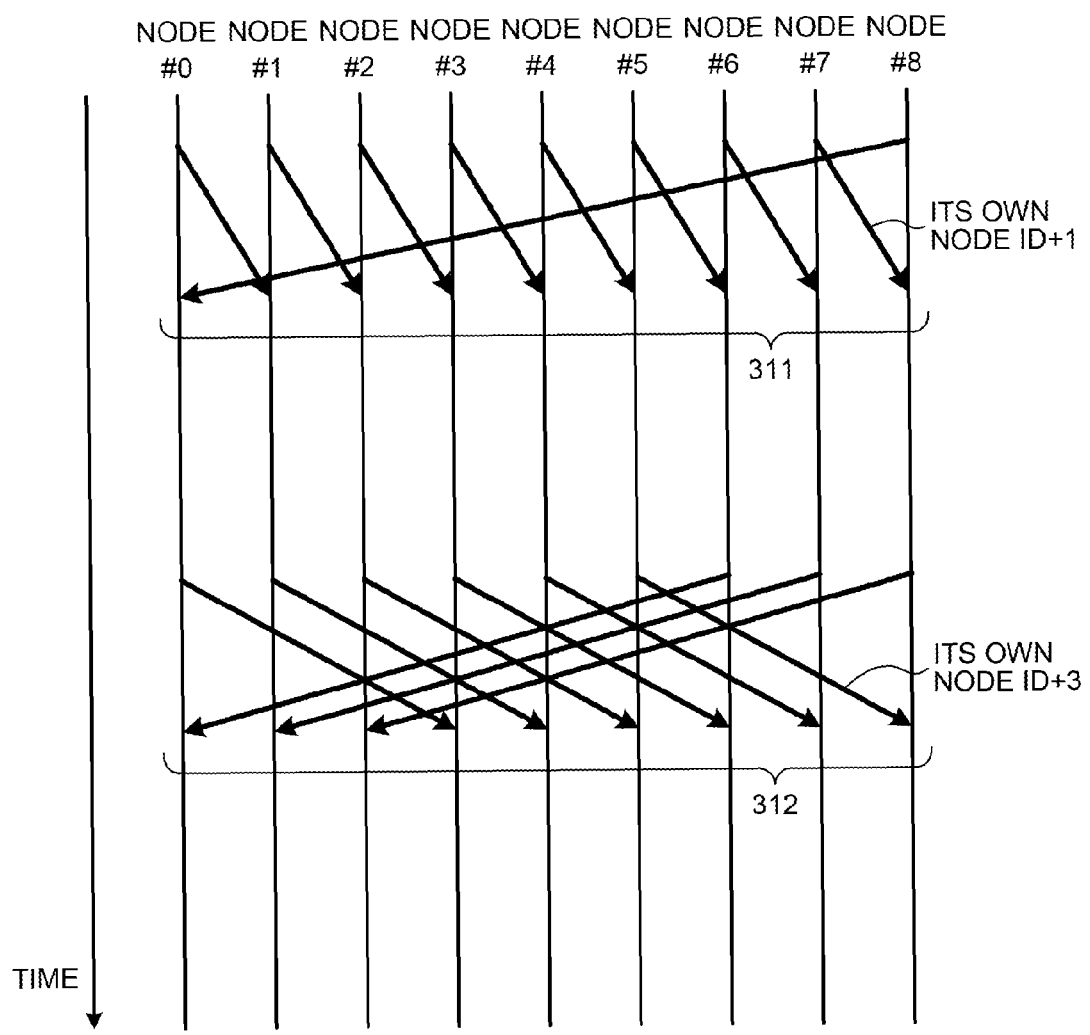
FIG. 5 is a schematic diagram illustrating an example in which the information processing system according to the first embodiment selects a node at the sending destination.

Furthermore, selecting a node at the sending destination will be specifically described with reference to FIG. 5. FIG. 5 is a schematic diagram illustrating an example in which the information processing system according to the first embodiment selects a node at the sending destination. FIG. 5 illustrates a case in which the number of nodes N is 9. Furthermore, in FIG. 5, the nodes 10 are represented by nodes #0 to #8, which are also used in a description below. Here, each of the numbers attached after the symbol of # indicates the ID of each of the nodes 10. Here, a description will be given of a case in which the selecting unit 103 obtains the ID of the node 11 at the sending destination as $(A+3^{S-1})$ modN.

At a first step, each of the nodes #0 to #8 sends a signal used for synchronization as illustrated by synchronization signals 311 in FIG. 5. The node #0 selects the node with the ID of $(0+3^0)$ mod 9=1 as the sending destination node. Namely, the node #0 sends a synchronization signal to the node #1. Furthermore, the node #1 selects the node with the ID of $(1+3^0)$ mod 9=2 as the sending destination node. Namely, the node #1 sends a synchronization signal to the node #2. In this way, as illustrated by the synchronization signals 311, each of the nodes #1 to #7 uses the node with the ID that is indicated by the number obtained by adding 1 to the ID number of its own node as the sending destination node and the node #8 uses the node #1 as the sending destination node.

Then, at a second step, as illustrated by synchronization signals 312, each of the nodes #0 to #8 sends a synchronization signal. The node #0 selects the node with the ID of $(0+3^1)$ mod 9=3 as the sending destination node. Namely, the node #0 sends a synchronization signal to the node #3. Furthermore, the node #1 selects the node with the ID of $(1+3^1)$ mod 9=4 as the sending destination node. Namely, the node #1 sends a synchronization signal to the node #4.

In this way, as illustrated by the synchronization signals 311, each of the nodes #1 to #5 uses the node with the ID number obtained by adding 3 to the ID number of its own node as the sending destination node. Furthermore, the nodes #6 to #8 uses the node with the ID number obtained by subtracting the total number of nodes from the sum of 3 and the ID number of its own node as the sending destination node.

In the following, ascertainment of the node that has reached a synchronization point will be described by using the node #5 as an example. At the first step, the node #5 ascertains that the nodes #4 and #6 have reached the synchronization point.

At the second step, the node #5 ascertains, on the basis of the synchronization signal sent from the node #2, that the nodes #1 to #3 have reached the synchronization point. Furthermore, because the node #5 was able to send the synchronization signal to the node #8 that ascertained, at the first step, that the node #7 and #0 had reached the synchronization point, the node #5 ascertains that the nodes #0, #7, and #8 have reached the synchronization point.

At this point, the node #5 ascertains that nodes #0 to #4 and #6 to #8, i.e., all of the nodes other than the node #5 itself, have reached the synchronization point. In this way, all of the nodes #0 to #8 ascertain that all of the nodes have reached the synchronization point.

In the following, a description of end determination performed by the determining unit 104 will be described. At the first step, because 1, i.e., the number of steps, is smaller than $\log_3$ 9, the determining unit 104 determines that each of the nodes #0 to #8 does not ascertain whether all of the other nodes have reached the synchronization point. At the second step, because 2, i.e., the number of steps, is the same as $\log_3$ 9, the determining unit 104 determines that each of the nodes #0 to #8 ascertains that all of the nodes have reached the synchronization point and then ends the barrier synchronization process.

In the following, the flow of the barrier synchronization process performed by the information processing system according to the first embodiment will be described with reference to FIG. 6. FIG. 6 is a flowchart illustrating a barrier synchronization process performed by the information processing system according to the first embodiment.

The determining unit 104 sets the number of steps in which the determining process has been completed to 0 (Step S1). Then, the determining unit 104 notifies the selecting unit 103 whether the number of steps in which the determining process has been completed.

Then, the selecting unit 103 receives, from the determining unit 104, the number of steps in which the determining process has been completed. Then, the selecting unit 103 increments the number of steps by 1 (Step S2).

The selecting unit 103 selects, as the node 11 that is the sending destination of the synchronization signal, the node with the ID of $(A+3^{S-1})$ modN, where A is the ID of its own node, S is the number of steps, and N is the total number of the nodes (Step S3).

The receiving unit 102 performs the reception preparation (Step S4). The receiving unit 102 makes the reception buffer empty during the time period for which the reception preparation is being performed. Then, the receiving unit 102 determines whether the reception preparation has been completed (Step S5). If the reception preparation has not been completed (No at Step S5), the receiving unit 102 returns to Step S4.

In contrast, if the reception preparation has been completed (Yes at Step S5), the receiving unit 102 sends information indicating that the reception buffer is empty to the node 12 at the sending source of the synchronization signal and notifies the completion of the reception preparation (Step S6). Specifically, the process performed at Step S6 is performed by the network interface card 111 at the hardware level.

The sending unit 101 determines whether the reception preparation has been completed in the node 11 that is the sending destination depending on whether the notification of the information indicating that reception buffer is empty was received from the node, which is the sending destination, with the ID of $(A+3^{S-1})$ modN (Step S7). If the reception preparation has not been completed at the sending destination node (No at Step S7), the sending unit 101 waits until the reception preparation is completed at the node 11 that is the sending destination.

In contrast, if the reception preparation has been completed at the sending destination node (Yes at Step S7), the sending unit 101 sends a synchronization signal to the sending destination node with the ID of $(A+3^{S-1})$ modN (Step S8). The sending unit 101 notifies the determining unit 104 that the synchronization signal has been sent to the node 10, which is the sending destination, with the ID of $(A+3^{S-1})$ modN.

The receiving unit 102 determines whether the synchronization signal has been received from the node 12 that is the sending source (Step S9). If the synchronization signal has not been received (No at Step S9), the receiving unit 102 waits until the synchronization signal is received.

In contrast, if the synchronization signal has been received (Yes at Step S9), the receiving unit 102 sends the received synchronization signal to the determining unit 104. The determining unit 104 acquires the ID of the node that has reached the synchronization point from the received synchronization signal and the ID of the node 11 at the sending destination and to which the sending unit 101 sent the synchronization signal (Step S10).

Then, the determining unit 104 determines whether the number of steps to be performed is equal to or greater than $\log_3 N$ (Step S11). If the number of steps is less than $\log_3 N$ (No at Step S11), the determining unit 104 returns to Step S2.

In contrast, if the number of steps is equal to or greater than $\log_3 N$ (Yes at Step S11), the determining unit 104 ends the barrier synchronization process.

At this point, in the information processing system 1, two types of communication i.e., the communication performed between CPUs in a single node (hereinafter, referred to as "inside-node communication") and the communication performed between different nodes (hereinafter, referred to as "inter-node communication"), are performed. Accordingly, a description will be given of barrier synchronization performed in these types of communication.

In the following, a description will be given of the communication performed between the CPU 113 and the CPU 114 (see FIG. 1) in the same node 10. In the inside-node communication, the CPUs 113 and 114 can access a shared memory. Accordingly, barrier synchronization between the CPU 113 and the CPU 114 can be implemented by performing communication vie a shared memory.

For example, if the memory 112 is a shared memory, the CPU 113 writes data in the memory 112 and the CPU 114 reads the written data, thereby the CPU 114 ascertains that the CPU 113 has reached the synchronization point. Accordingly, in the inside-node communication, there is no need to send a notification indicating the reaching of the synchronization point by sending and receiving a synchronization signal.

In contrast, in the inter-node communication that is performed between different nodes, a shared memory is not present. Accordingly, in the inter-node communication, the reaching of the synchronization point is notified by sending and receiving a synchronization signal. Consequently, the process for barrier synchronization that is performed by using the sending and receiving of a synchronization signal described above is preferably performed in the inter-node communication.

As described above, in the information processing system according to the first embodiment, a node ascertains, by itself, a node at the sending destination by sending a synchronization signal and ascertains, by itself, that a node, which has been ascertained by the node at the sending destination that the node reached the synchronization point, has reached the synchronization point. Furthermore, in the information processing system according to the first embodiment, a node ascertains, by itself, a node at the sending source by receiving a synchronization signal and ascertains, by itself, that a node, which has been ascertained by the sending source node that the node reached the synchronization point, has reached the synchronization point. Consequently, it is possible to ascertain that a counterpart node has reached the synchronization point without sending and receiving data between nodes and thus it is possible to reduce the time taken for the barrier synchronization process.

Furthermore, in the information processing system according to the first embodiment, a node with the ID of $(A+3^{S-1})$ modN, where A is ID of its own node, S is the number of steps, N is the total number of nodes, by using sequence numbers starting from zero as the ID of a node, is defined as a node at the sending destination for the synchronization signal. Consequently, it is possible to more quickly check whether all of the nodes have reached the synchronization point.

For example, when the node with the ID of $(A+3^{S-1})$ modN is used as the node at the sending destination for the synchronization signal, the number of steps for ascertaining whether all of the nodes have reached the synchronization point is $\log_3 N$. In contrast, as with the conventional technology, when ascertaining whether all of the nodes have reached the synchronization point by sending and receiving data using a combination of two nodes, the number of steps for ascertaining whether all of the nodes have reached the synchronization point is $\log_2 N$. Specifically, by using the information processing system according to the first embodiment, the number of steps can be reduced to about ⅔ compared with the conventional technology.

For example, when the number of nodes N is 2000, if the conventional technology is used, the number of steps is 15; however, in the information processing system according to the first embodiment, the number of steps is only 10. In this way, the information processing system according to the first embodiment can reduce the time taken for the barrier synchronization process when compared with a case in which the conventional technology is used.

Furthermore, in the following, a description will be given of a reason the barrier synchronization process performed by the information processing apparatus according to the first embodiment is faster than that of the conventional technology. In general, the performance of sending and receiving data at an application level is worse than the communication at the hardware level. In the first embodiment, each node determines, by using the communication at the hardware level, whether a reception preparation has been completed and then sends, in response to this communication at the hardware level, a synchronization signal by using the communication at the application level. In contrast, in the conventional technology, each node sends a synchronization signal by using the communication at the application level and sends, by using the communication at the application level when the signal is received, a response indicating the reception of the signal. Specifically, with the information processing apparatus according to the first embodiment, the number of times the communication at the application level is reduced and, furthermore, instead of using the communication at the application level, the communication at the hardware level is used. Consequently, the information processing apparatus according to the first embodiment can implement barrier synchronization at a high speed compared with the conventional technology.

[b] Second Embodiment

In the following, a second embodiment will be described. An information processing system according to the second embodiment differs from the first embodiment in that a method of selecting a sending destination node differs. The nodes included in the information processing system according to the second embodiment can also be illustrated in FIG. 1. In a description below, components having the same function as that performed in the first embodiment will not be described.

First, the selecting unit 103 forms a group that includes therein the node 10, which is its own node, and the other two nodes 10. Hereinafter, a group to which its own node belongs is referred to as an "its own group". Then, between the other two nodes 10 belonging to its own group, the selecting unit 103 selects one of the two nodes 11 as the sending destination. At this point, the selecting unit 103 selects the node such that the sending destination is not overlapped between the nodes in the group. For example, by selecting the ID of the sending destination in accordance with a predetermined algorithm, the selecting unit 103 avoids the overlap of the sending destination.

Then, when the selecting unit 103 receives, from the determining unit 104, information indicating that the process for determining whether a node has reached the synchronization point is ended at the first step, the selecting unit 103 ascertains that all of the other nodes 10 belonging to its own group have reached the synchronization point. Then, the selecting unit 103 selects two groups that are other than its own group and forms a group set in which three groups including its own group are included. At this point, the selecting unit 103 selects the groups so as to form the group set in which the selecting unit 103 in each of the other nodes 10 in its own group is in the same group. For example, by forming a group set in accordance with the predetermined algorithm, the selecting unit 103 can form a group set in which the selecting unit 103 in the other node 10 in its own group is in the same group.

Then, the selecting unit 103 selects one of the groups other than its own group in the formed group set as the group at the sending destination. At this point, the selecting unit 103 selects the group such that groups at the sending destination do not overlap with each other among groups belonging to the same group set. Furthermore, for the selecting unit 103 in the node 10 belonging to the same group, the same group is selected as the group at the sending destination. For example, by selecting a group at the sending destination in accordance with the predetermined algorithm, the selecting unit 103 can avoid an overlap of the sending destinations among the groups and also can implement selection of the same group in the group.

Then, the selecting unit 103 selects the node 10 at the sending destination from the group at the sending destination. At this point, the selecting unit 103 in the node 10 included in the same group is selected such that each of the nodes 10 at the sending destination do not overlap. For example, by selecting the ID of the sending destination in accordance with the predetermined algorithm, the selecting unit 103 avoids an overlap of the sending destinations.

Then, the selecting unit 103 notifies the sending unit 101 of the ID of the selected node 11 at the sending destination.

The selecting unit 103 repeatedly selects the node 11 at the sending destination and repeatedly sends a notification to the sending unit 101 until the selecting unit 103 receives a notification from the determining unit 104 indicating that the barrier synchronization process has ended.

Figure 7A:
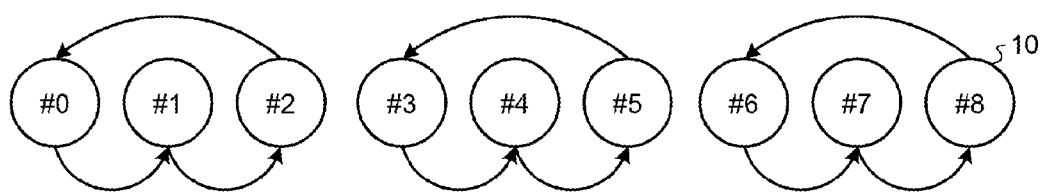
FIG. 7A is a schematic diagram illustrating the transmission state of synchronization signals at a first step in an information processing system according to a second embodiment, where N is 9.
Figure 7B:
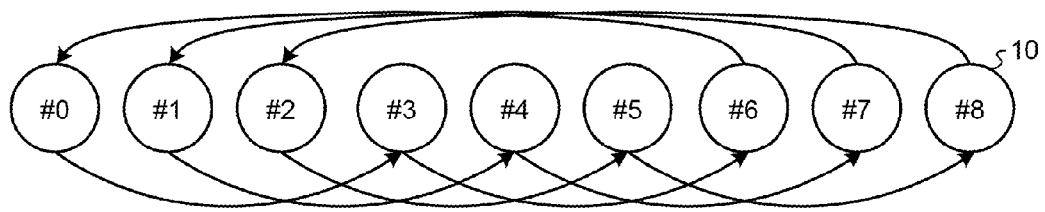
FIG. 7B is a schematic diagram illustrating the transmission state of synchronization signals at a second step in the information processing system according to the second embodiment, where N is 9.

For example, transmission of a synchronization signal sent by each of the nodes 10 will be described with reference to FIGS. 7A and 7B by using a case in which the number of nodes 10 belonging to the information processing system 1 is 9. FIG. 7A is a schematic diagram illustrating the transmission state of synchronization signals at a first step in an information processing system according to a second embodiment, where N is 9. FIG. 7B is a schematic diagram illustrating the transmission state of synchronization signals at a second step in the information processing system according to the second embodiment, where N is 9. In FIGS. 7A and 7B, each of the nodes are represented by nodes #0 to #8 and, in a description below, a description will be given by using the nodes #0 to #8. Here, each of the numbers attached after the symbol of # indicates the ID of each of the nodes 10.

The nodes #0 to #8 are divided into three groups, i.e., the group to which the nodes #0 to #2 belong, the group to which the nodes #3 to #5 belong, and the group to which the nodes #6 to #8 belong.

At the first step, as illustrated in FIG. 7A, each of the nodes selects its sending destination such that the sending destinations of the synchronization signal do not overlap in the same group. For example, the node #0 uses the node #1 as the sending destination, the node #1 uses the node #2 as the sending destination, and the node #2 uses the node #0 as the sending destination.

At the first step, for example, node #5 ascertains that the nodes #3 and #4 have reached the synchronization point.

Then, at the second step, the group to which the nodes #0 to #2 belong selects the group to which the nodes #3 to #5 belong as the group at the sending destination. The group to which the nodes #3 to #5 belong selects the group to which the nodes #6 to #8 belong as the group at the sending destination. The group to which the nodes #6 to #8 belong selects the group to which the nodes #0 to #2 belong as the group at the sending destination.

Furthermore, each of the nodes belonging to one of the groups selects a node at the sending destination such that selected nodes do not overlap in the selected group at the sending destination. For example, the node #0 uses the node #3 as the sending destination, the node #1 uses the node #4 as the sending destination, and the node #2 uses the node #5 as the sending destination. At this point, because all of the nodes in the group at the sending destination have already ascertained that all of the nodes in the group have reached the synchronization point, any node in the group may be selected.

At the second step, for example, the node #5 ascertains that the nodes #0 to #2 have reached the synchronization point on the basis of the synchronization signal sent from the node #2. Furthermore, because the node #5 was able to send the synchronization signal to the node #8 that had ascertained, at the first step, that nodes #6 and #7 reached the synchronization point, the node #5 ascertains that the nodes #6 to #8 have reached the synchronization point. Specifically, at this point, the node #5 ascertains that nodes #0 to #4 and #6 to #8, i.e., all of the nodes other than its own node, have reached the synchronization point. In this way, all of the nodes #0 to #8 ascertain that all nodes have reached the synchronization point.

At this point, if the number of nodes is further increased, groups to each of which a node that ascertains, at the subsequent step, the reaching of the synchronization point belongs are used as a group set. Then, a node belonging to each of the group selects a group set that includes a node that has not reached the synchronization point and then selects a node at the sending destination such that nodes do not overlap.

In the above description, for convenience of description, three nodes belong to a single group and then a group to which a node that has reached the synchronization point belongs is used as a group set. However, in practice, by selecting a node at the sending destination in accordance with the predetermined algorithm, it is possible to implement a process for selecting a sending destination described above.

For example, a description will be given with the assumption that the total number of nodes is a value of a power of three, sequence numbers starting from zero is allocated to the ID of a node, the ID of its own node is "A", and the number of steps is "S". In such a case, at each step, by selecting a node with the ID of "$(A+3^{S-1}) \mod(3^S)+A$" as a node at the sending destination, each of the nodes can implement a process for selecting the node 11 at the sending destination described above.

Specifically, the selecting unit 103 performs a process that selects, for each step, the node 11 at the sending destination in accordance with the predetermined algorithm, such as $(A+3^{S-1}) \mod(3^S)+A$, and that notifies the sending unit 101 of the ID of the selected node 11.

As described above, in the information processing system according to the second embodiment, nodes are divided into groups such that three nodes belong in the same group and then, by using the group, a node at the sending destination for a synchronization signal is determined. In this way, various methods other than the method described in the first embodiment may also be used for selecting a node at the sending destination for a synchronization signal. Even when these methods are used, it is possible to reduce the time taken for the barrier synchronization process.

Figure 8:
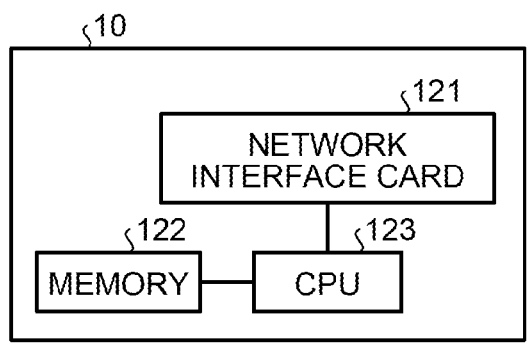
FIG. 8 is a block diagram illustrating another example of the configuration of a node.

In the embodiments described above, a description has been given of an example in which a node includes two CPUs and two memories; however, the hardware configuration of the node is not limited thereto. For example, FIG. 8 is a block diagram illustrating another example of the configuration of a node. As illustrated in FIG. 8, the same effect can be obtained by using the node 10 that includes therein a network interface card 121, a memory 122, and a CPU 123.

According to an aspect of an embodiment of the information processing system and the control method of the information processing system disclosed in the invention, an advantage is provided in that the time taken for barrier synchronization can be reduced.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system comprising:
a plurality of information processing apparatuses, wherein each of the information processing apparatuses has an identification number which is a sequence number starting from zero and includes
a sending unit that sends a signal to another information processing apparatus,
a receiving unit that receives a signal from another information processing apparatus,
a determining unit that determines, when the sending unit sends the signal to another information processing apparatus, that synchronization has been established with the information processing apparatus at the sending destination, that determines, when the receiving unit receives the signal from another information processing apparatus, that synchronization has been established with the information processing apparatus at the sending source, and that determines, when another information processing apparatus in which synchronization has been established with a specific information processing apparatus that has been determined that synchronization was established exists, that synchronization has been established with the other information processing apparatus that has been determined to exist, and
a selecting unit that selects, as the information processing apparatus at the sending destination for a signal, an information processing apparatus which is not determined, by the determining unit, that synchronization has been established and which has an identification number that corresponds to a remainder left when the sum of the identification number of the information processing apparatus and three raised to the power of the number of times a selection of an information processing apparatus at the sending destination is performed is divided by the total number of the information processing apparatuses.

2. The information processing system according to claim 1, wherein, when the sending unit acquires information indicating that a reception preparation of the information processing apparatus at the sending destination has been completed, the sending unit sends a signal to the information processing apparatus at the sending destination.

3. The information processing system according to claim 1, wherein the selecting unit selects, as the information processing apparatus at the sending destination for a signal, an information processing apparatus that is not determined, by the determining unit, that synchronization has been established and that has established synchronization with an information processing apparatus that has not established synchronization with the information processing apparatus.

4. An information processing system comprising:
a plurality of information processing apparatuses, wherein each of the information processing apparatuses has an identification number which is a sequence number starting from zero and includes
   a sending unit that sends a signal to another information processing apparatus,
   a receiving unit that receives a signal from another information processing apparatus,
   a determining unit that determines, when the sending unit sends the signal to another information processing apparatus, that synchronization has been established with the information processing apparatus at the sending destination, that determines, when the receiving unit receives a signal from another information processing apparatus, that synchronization has been established with the information processing apparatus at the sending source, and that determines, when another information processing apparatus in which synchronization has been established with a specific information processing apparatus that has been determined that synchronization was established exists, that synchronization has been established with the other information processing apparatus that has been determined to exist, and
the selecting unit that select, as the information processing apparatus at the sending destination, an information processing apparatus which is not determined, by the determining unit, that synchronization has been established and which has an identification number that corresponds to a remainder left when the difference when the identification number of the information processing apparatus is subtracted from three raised to the power of the number of times a selection of an information processing apparatus at the sending destination is performed is divided by the total number of the information processing apparatuses.

5. The information processing system according to claim 4, wherein, when the sending unit acquires information indicating that a reception preparation of the information processing apparatus at the sending destination has been completed, the sending unit sends a signal to the information processing apparatus at the sending destination.

6. The information processing system according to claim 4, wherein the selecting unit selects, as an information processing apparatus at the sending destination for a signal, an information processing apparatus that is not determined, by the determining unit, that synchronization has been established and that has established synchronization with an information processing apparatus that has not established synchronization with the information processing apparatus.

7. An information processing system comprising:
a plurality of information processing apparatuses, wherein each of the multiple information processing apparatuses forms a group to which three information processing apparatuses including the information processing apparatus belong and includes
   a sending unit that sends a signal to another information processing apparatus,
   a receiving unit that receives a signal from another information processing apparatus,
   a determining unit that determines, when the sending unit sends the signal to another information processing apparatus, that synchronization has been established with the information processing apparatus at the sending destination, that determines, when the receiving unit receives the signal from another information processing apparatus, that synchronization has been established with the information processing apparatus at the sending source, and that determines, when another information processing apparatus in which synchronization has been established with a specific information processing apparatus that has been determined that synchronization was established exists, that synchronization has been established with the other information processing apparatus that has been determined to exist, and
the selecting unit selects the information processing apparatus at the sending destination such that a signal is sent to one of the other information processing apparatuses in the group to which the information processing apparatus belongs and a signal is received from the other one of the information processing apparatuses in the group,
after synchronization has been completed in the group, the selecting unit selects two groups from among groups that have not yet been selected and to which an information processing apparatus that has not yet established synchronization with the information processing apparatus belongs,
the selecting unit selects an information processing apparatus from each group such that each of the selected information processing apparatuses in each group is associated with each of the information processing apparatuses in the group which includes the information processing apparatus, and
the selecting unit selects the information processing apparatus at the sending destination such that a signal is sent to one of the selected information processing apparatuses and a signal is received from one of the other selected information processing apparatuses.

8. The information processing system according to claim 7, wherein, when the sending unit acquires information indicating that a reception preparation of the information processing apparatus at the sending destination has been completed, the sending unit sends a signal to the information processing apparatus at the sending destination.

9. The information processing system according to claim 7, wherein the selecting unit selects, as an information processing apparatus at the sending destination for a signal, an information processing apparatus that is not determined, by the determining unit, that synchronization has been established and that has established synchronization with an information processing apparatus that has not established synchronization with the information processing apparatus.

10. A control method of an information processing system that includes a plurality of information processing apparatuses, an identification number which is a sequence number starting from zero being allocated to each of the plurality of information processing apparatuses, the control method comprising:
selecting, performed by each of the information processing apparatuses, as an information processing apparatus at the sending destination for a signal, an information processing apparatus in which synchronization has not been established and which has an identification number that corresponds to a remainder left when the sum of the identification number of the information processing apparatus and three raised to the power of the number of times a selection of an information processing apparatus at the sending destination is performed is divided by the total number of the information processing apparatuses;

sending, performed by each of the information processing apparatuses, the signal to the information processing apparatus at the sending destination;

receiving, performed by each of the information processing apparatuses, the signal from the information processing apparatus at the sending destination;

receiving, performed by each of the information processing apparatuses, a signal from an information processing apparatus that has selected the information processing apparatus as an information processing apparatus at the sending destination;

determining, performed by each of the information processing apparatuses, when a signal is sent to the information processing apparatus to the sending destination, that synchronization has been established with the information processing apparatus at the sending destination;

determining, performed by each of the information processing apparatuses, when a signal is received from the information processing apparatus that has selected the information processing apparatus as the information processing apparatus at the sending destination, that synchronization has been established with the information processing apparatus at the sending source;

determining, performed by each of the information processing apparatuses, when an information processing apparatus in which synchronization has already been established with the information processing apparatus that has been determined that synchronization was established exists, that synchronization has been established with the information processing apparatus that has been determined to exists; and repeating, performed by each of the information processing apparatuses, determination whether the signal has been sent and received and whether synchronization has been established until synchronization is established with all of the multiple information processing apparatuses.

11. A control method of an information processing system that includes a plurality of information processing apparatuses, an identification number which is a sequence number starting from zero being allocated to each of the plurality of information processing apparatuses, the control method comprising:

selecting, performed by each of the information processing apparatuses, as an information processing apparatus at the sending destination for a signal, an information processing apparatus in which synchronization has not been established and which has an identification number that corresponds to a remainder left when the difference of the identification number of the information processing apparatus is subtracted from three raised to the power of the number of times a selection of an information processing apparatus at the sending destination is performed is divided by the total number of the information processing apparatuses;

sending, performed by each of the information processing apparatuses, the signal to the information processing apparatus at the sending destination;

receiving, performed by each of the information processing apparatuses, the signal from the information processing apparatus at the sending destination;

receiving, performed by each of the information processing apparatuses, a signal from an information processing apparatus that has selected the information processing apparatus as an information processing apparatus at the sending destination;

determining, performed by each of the information processing apparatuses, when a signal is sent to the information processing apparatus to the sending destination, that synchronization has been established with the information processing apparatus at the sending destination;

determining, performed by each of the information processing apparatuses, when a signal is received from the information processing apparatus that has selected the information processing apparatus as the information processing apparatus at the sending destination, that synchronization has been established with the information processing apparatus at the sending source;

determining, performed by each of the information processing apparatuses, when an information processing apparatus in which synchronization has already been established with the information processing apparatus that has been determined that synchronization was established exists, that synchronization has been established with the information processing apparatus that has been determined to exists; and repeating, performed by each of the information processing apparatuses, determination whether the signal has been sent and received and whether synchronization has been established until synchronization is established with all of the multiple information processing apparatuses.

12. A control method of an information processing system that includes a plurality of information processing apparatuses, each of the plurality of the information processing apparatuses forming a group to which three information processing apparatuses including the information processing apparatus belong, the control method comprising:

selecting, performed by each of the information processing apparatuses, an information processing apparatus in which synchronization has not been established as an information processing apparatus at a sending destination for a signal;

selecting, performed by each of the information processing apparatuses, the information processing apparatus at the sending destination such that a signal is sent to one of the other information processing apparatuses in the group to which the information processing apparatus belongs and a signal is received from the other one of the information processing apparatuses in the group, selecting, performed by each of the information processing apparatuses, two groups from among groups that have not yet been selected and to which an information processing apparatus that has not yet established synchronization with the information processing apparatus belongs after synchronization has been completed in the group, selecting, performed by each of the information processing apparatuses, an information processing apparatus from each group such that each of the selected information processing apparatuses in each group is associated with each of the information processing apparatuses in the group which includes the information processing apparatus, selecting, performed by each of the information processing apparatuses, the information processing apparatus at the sending destination such that a signal is sent to one of the selected information processing apparatuses and a signal is received from one of the other selected information processing apparatuses, sending, performed by each of the information processing apparatuses, the signal to the information processing apparatus at the sending destination;

receiving, performed by each of the information processing apparatuses, the signal from the information processing apparatus at the sending destination;

receiving, performed by each of the information processing apparatuses, a signal from an information processing apparatus that has selected the information processing apparatus as an information processing apparatus at the sending destination;

determining, performed by each of the information processing apparatuses, when a signal is sent to the information processing apparatus to the sending destination, that synchronization has been established with the information processing apparatus at the sending destination;

determining, performed by each of the information processing apparatuses, when a signal is received from the information processing apparatus that has selected the information processing apparatus as the information processing apparatus at the sending destination, that synchronization has been established with the information processing apparatus at the sending source;

determining, performed by each of the information processing apparatuses, when an information processing apparatus in which synchronization has already been established with the information processing apparatus that has been determined that synchronization was established exists, that synchronization has been established with the information processing apparatus that has been determined exists; and repeating, performed by each of the information processing apparatuses, determination whether the signal has been sent and received and whether synchronization has been established until synchronization is established with all of the multiple information processing apparatuses.

* * * * *